United States Patent
Yu

(10) Patent No.: US 7,554,368 B2
(45) Date of Patent: Jun. 30, 2009

(54) FREQUENCY ADJUSTING CIRCUIT FOR CPU

(75) Inventor: Chia-Chuan Yu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 20 days.

(21) Appl. No.: 11/309,277

(22) Filed: Jul. 21, 2006

(65) Prior Publication Data
US 2007/0088962 A1    Apr. 19, 2007

(30) Foreign Application Priority Data
Oct. 14, 2005 (CN) .......... 2005 1 0100359

(51) Int. Cl.
*H03B 19/00* (2006.01)
(52) U.S. Cl. ............ 327/113; 327/184; 327/291; 323/282
(58) Field of Classification Search ............ 323/282; 327/113; 713/322
See application file for complete search history.

(56) References Cited
U.S. PATENT DOCUMENTS

| | | | | |
|---|---|---|---|---|
| 4,727,318 A * | 2/1988 | Sakai et al. | .......... | 324/765 |
| 4,893,018 A * | 1/1990 | Saitou | .......... | 250/370.1 |
| 5,180,987 A * | 1/1993 | Wendt | .......... | 327/105 |
| 5,233,314 A * | 8/1993 | McDermott et al. | .......... | 331/17 |
| 5,874,840 A * | 2/1999 | Bonaccio | .......... | 327/55 |
| 6,472,855 B2 * | 10/2002 | Ball | .......... | 323/282 |
| 2004/0168095 A1 * | 8/2004 | Yeh | .......... | 713/300 |

FOREIGN PATENT DOCUMENTS

CN    1485707 A    3/2004

OTHER PUBLICATIONS

"Operational Amplifier (Op-Amp) Basics," 1999, p. 1, "http://ourworld.compuserve.com/homepages/Bill_Bowden/opamp.htm".*

* cited by examiner

*Primary Examiner*—Kenneth B Wells
*Assistant Examiner*—Daniel Rojas
(74) *Attorney, Agent, or Firm*—Wei Te Chung

(57) ABSTRACT

A frequency adjusting circuit for a central processing unit (CPU) includes a transforming unit for transforming a change of a current signal of the CPU into a voltage signal, an amplifying unit for amplifying the voltage signal from the transforming unit, a switching unit being turned on or turned off by the amplified voltage signal from the amplifying unit, and a basic input/output chip for regulating a frequency of the CPU through a clock generator.

13 Claims, 2 Drawing Sheets

FREQUENCY ADJUSTING CIRCUIT FOR CPU

DESCRIPTION

1. Field of the Invention

The present invention relates to a frequency adjusting circuit for a central processing unit (CPU), and particularly to a frequency adjusting circuit which dynamically adjusts a frequency of a CPU according to a variation of a load on the CPU.

2. Description of Related Art

Computers are being used today to perform a wide variety of tasks. Many different areas of business, industry, government, education, and entertainment need to use the computers. Computers have also become a key technology for communicating ideas, data, and trends between and among business professionals.

Execution speed of a computer device depends on the performance characteristics of the individual components such as a central processing unit (CPU). The speed at which the CPU executes software instructions, is often most critical to overall execution speed of the computer device. Generally, a method to increase a frequency (also called overclocking) of the CPU is to set the frequency of the CPU in a basic input/output system (BIOS). Hence, the CPU works with the predetermined frequency until users reset the frequency of the CPU in the BIOS. However, a load applied on the CPU is variable, while the CPU work frequency is not. Furthermore, sensitivity of a load detector for the CPU is also important if the load detector is used to determine the load of the CPU. Poor sensitivity of the load detector cannot help to improve work efficiency of the CPU.

What is needed is a frequency adjusting circuit which dynamically adjusts a frequency of a CPU to vary with the load.

SUMMARY OF THE INVENTION

An exemplary frequency adjusting circuit for a central processing unit (CPU) includes a transforming unit for transforming a change of a current signal of the CPU into a voltage signal, an amplifying unit for amplifying the voltage signal from the transforming unit, a switching unit being turned on or turned off by the amplified voltage signal from the amplifying unit, and a basic input/output chip for regulating a frequency of the CPU through a clock generator.

Other objects, advantages and novel features will become more apparent from the following detailed description when taken in conjunction with the accompanying drawings, in which:

DETAILED DESCRIPTION OF THE INVENTION

Figure 1:
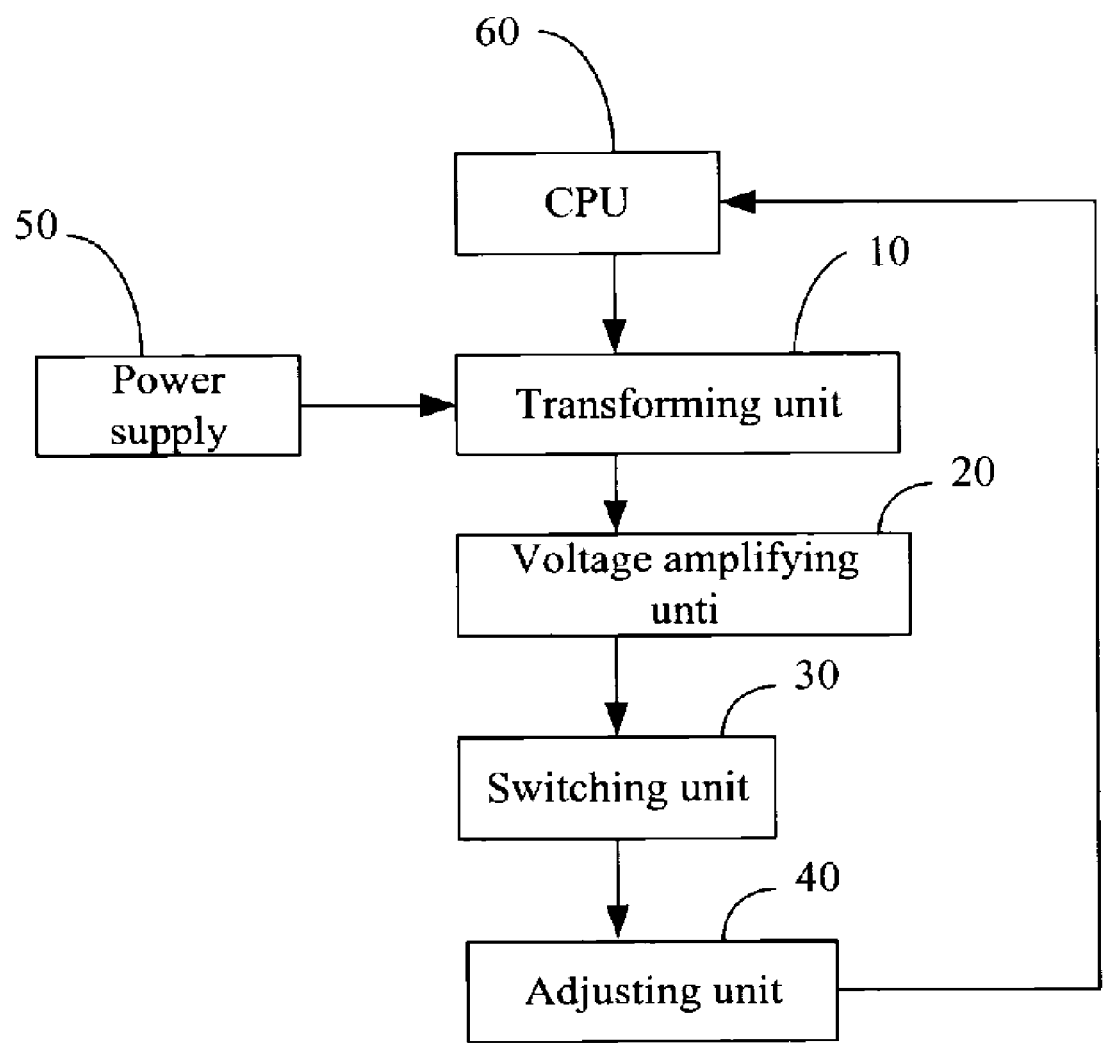
FIG. 1 is a block diagram of a frequency adjusting circuit for a CPU, in accordance with a preferred embodiment of the present invention.

Referring to FIG. 1, a block diagram of a frequency adjusting circuit for an electronic processing unit like a CPU 60, in accordance with a preferred embodiment of the present invention is shown. The frequency adjusting circuit includes a transforming unit 10, a voltage amplifying unit 20, a switching unit 30, an adjusting unit 40 that is for regulating a frequency of the CPU 60, and a power supply 50 providing a working voltage for the transforming unit 10. The transforming unit 10 receives a current signal from the CPU 60 and transforms the current signal into a voltage signal. The voltage signal is then sent to the voltage amplifying unit 20 and amplified. The amplified signal is input to the switching unit 30, and then the switching unit 30 outputs a control signal to the adjusting unit 40 according to the amplified voltage signal. The adjusting unit 40 regulates a frequency of the CPU 60 according to the control signal.

Figure 2:
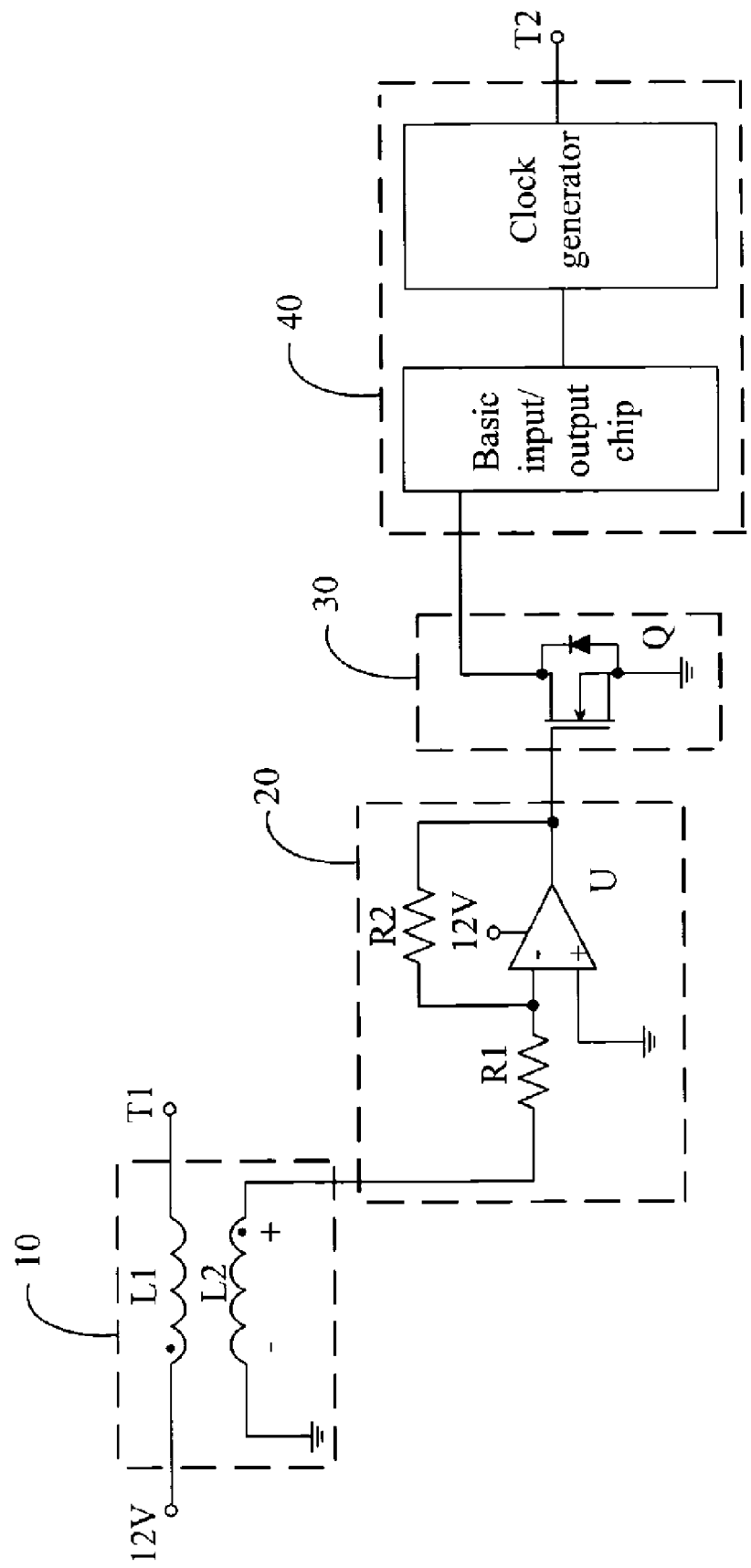
FIG. 2 is a circuit diagram of FIG.1.

Referring to FIG. 2, a circuit diagram of FIG. 1 is shown. The transforming unit 10 includes a primary induction coil L1 and a secondary induction coil L2. The amplifying unit 20 includes an amplifier U, and resistors R1, R2. The switching unit 30 includes a metal-oxide semiconductor field-effect transistor (MOSFET) Q. The adjusting unit 40 includes a basic input/output chip and a clock generator connected to the basic input/output chip. The MOSFET Q is an n-channel depletion MOSFET. A 12V voltage is input to a positive terminal of the primary induction coil L1, and a negative terminal of the primary induction coil L1 is connected to an input terminal T1 of the CPU. The CPU 60 outputs a current signal to the primary induction coil L1 through the input terminal T1. A negative terminal of the secondary induction coil L2 is grounded. A positive terminal of the secondary induction coil L2 is connected to an inverting input of the amplifier U through the resistor R1. A non-inverting input of the amplifier U is grounded. The resistor R2 is connected between the inverting input and an output of the amplifier U. The output of the amplifier U is connected to a gate of the MOSFET Q. A source of the MOSFET Q is grounded. A drain of the MOSFET Q is connected to the basic input/output chip. The clock generator is connected to the CPU 60 through an output terminal T2.

In the transforming unit 10, the current signal of the CPU 60 is applied to the primary induction coil L1. When a load applied on the CPU 60 changes, the current signal applied on the primary induction coil L1 also changes. Therefore, the secondary induction coil L2 produces an induction current signal according to the electromagnetic induction law. An electromotive force of the secondary induction coil L2 is as follows: $E2=M\Delta i1/\Delta t$, where "$\Delta i1/\Delta t$" specifies a rate of change in the current signal of the primary induction coil L1, and "M" is a mutual inductance between the primary induction coil L1 and the secondary induction coil L2.

An output voltage of the amplifier U is set by the resistors R1 and R2 as follows: $Vout=E2(R2/R1)$. A resistance of the resistor R2 is greater than that of the resistor R1, thus, the amplifier U amplifies the electromotive force E2 of the secondary induction coil L2.

If the load applied to the CPU 60 increases, the current signal applied to the primary induction coil L1 increases, that is to say, $\Delta i1/\Delta t>0$. Because a polarity of the output voltage of the amplifier U is contrary to that of the voltage applied on the inverting input of the amplifier U, the MOSFET Q is turned on, and the control signal is input to the basic input/output chip. The basic input/output chip increases the frequency of the CPU 60 according to an increasing magnitude of the current signal of the CPU 60. If the load applied to the CPU 60 decreases, $\Delta i1/\Delta t<0$, the polarity of electromotive force of the secondary induction coil L2 is then contrary to that of the current signal of the CPU 60, and the MOSFET Q is turned off, and the basic input/output chip regulates the CPU 60 to work with an original lower frequency. So, the adjusting circuit of the preferred embodiment dynamically regulates the frequency of the CPU 60 according to the load applied to the CPU 60. Due to use of the induction coils L1 and L2, sensitivity of the transforming unit 10 to detect the load of the CPU 60 is high.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A frequency adjusting circuit for a central processing unit (CPU), comprising:
   a transforming unit for transforming a change of a current signal of the CPU into a voltage signal, the transforming unit comprising a primary induction coil and a secondary induction coil, the primary induction coil and the secondary induction coil each comprising a positive terminal and a negative terminal, the positive terminal of the primary induction coil connected to a power supply, the negative terminal of the primary induction coil connected to the CPU, and the negative terminal of the secondary coil grounded;
   an amplifying unit for amplifying the voltage signal from the transforming unit;
   a switching unit being turned on or turned off by the amplified voltage signal from the amplifying unit, the switching unit outputting a control signal according to the amplified voltage signal; and
   a basic input/output chip receiving the control signal to regulate a frequency of the CPU through a clock generator connected between the basic input/output chip and the CPU.

2. The frequency adjusting circuit as claimed in claim 1, wherein the amplifying unit comprises an amplifier, a first resistor, and a second resistor, the amplifier comprises an inverting input, a non-inverting input, and an output, the first resistor is connected between the positive terminal of the secondary induction coil and the inverting input of the amplifier, the second resistor is connected between the inverting input and the output of the amplifier, and the non-inverting input is grounded.

3. The frequency adjusting circuit as claimed in claim 2, wherein the switching unit comprises a metal-oxide semiconductor field-effect transistor (MOSFET), the MOSFET comprises a gate, a source, and a drain, the gate of the MOSFET is connected to the output of the amplifier, the drain of the MOSFET is connected to the basic input/output chip, and the source of the MOSFET is grounded.

4. The frequency adjusting circuit as claimed in claim 3, wherein the MOSFET is an n-channel depletion MOSFET.

5. The frequency adjusting circuit as claimed in claim 3, wherein when the MOSFET is turned on, the basic input/output chip receives the control signal, and the basic input/output chip regulates the CPU to work with a relatively higher frequency through the clock generator, and when the MOSFET is turned off, the basic input/output chip regulates the CPU to work with an original lower frequency through the clock generator.

6. A frequency adjusting circuit for a central processing unit (CPU), comprising:
   a transforming unit for transforming a change of a current signal of the CPU into a voltage signal, the transforming unit comprising a primary induction coil and a secondary induction coil, the primary induction coil and the secondary induction coil each comprising a positive terminal and a negative terminal, the positive terminal of the primary induction coil connected to a power supply, the negative terminal of the primary induction coil connected to the CPU, and the negative terminal of the secondary coil grounded;
   an amplifying unit for amplifying the voltage signal from the transforming unit;
   a switching unit being turned on or turned off by the amplified voltage signal from the transforming unit, the switching unit outputting a control signal according to the amplified voltage signal; and
   a basic input/output chip receiving the control signal to regulate a frequency of the CPU through a clock generator connected between the basic input/output chip and the CPU according to a work state of the switching unit.

7. The frequency adjusting circuit as claimed in claim 6, wherein the amplifying unit comprises a amplifier, a first resistor, and a second resistor, the amplifier comprises an inverting input, a non-inverting input, and an output, the first resistor is connected between the positive terminal of the secondary induction coil and the inverting input of the amplifier, the second resistor is connected between the inverting input and the output of the amplifier, and the non-inverting input is grounded.

8. The frequency adjusting circuit as claimed in claim 7, wherein the switching unit comprises a metal-oxide semiconductor field-effect transistor (MOSFET), the MOSFET comprises a gate, a source, and a drain, the gate of the MOSFET is connected to the output of the amplifier, and the source of the MOSFET is grounded.

9. The frequency adjusting circuit as claimed in claim 8, wherein the basic input/output chip is connected to the drain of the MOSFET and the clock generator is connected to the basic input/output chip, when the MOSFET is turned on, the basic input/output chip receives the control signal, and the basic input/output chip regulates the CPU to work with a relatively higher frequency through the clock generator, and when the MOSFET is turned off, the basic input/output chip regulates the CPU to work with an original lower frequency through the clock generator.

10. A circuit for adjusting work frequency of an electronic processing unit, comprising:
    a transforming unit electrically connectable with an electronic processing unit to sense current signals from said electronic processing unit and inducibly transform said current signals into first corresponding signals;
    a switching unit electrically connectable with said transforming unit to accept said first corresponding signals from said transforming unit, and responsive to said accepted first corresponding signals to switch a work status thereof in order to generate second corresponding signals based on said work status of said switching unit; and
    an adjusting unit comprising a basic input/output chip receiving said second corresponding signals to regulate a frequency of said electronic processing unit through a clock generator connected between said basic input/output chip and said electronic processing unit,
    wherein said transforming unit comprises a primary induction coil to accept said current signals and a secondary induction coil to inducibly transform said accepted current signals into said first corresponding signals.

11. The circuit as claimed in claim 10, further comprising an amplifying unit electrically connectable between said transforming unit and said switching unit for amplifying said first corresponding signals before said first corresponding signals are further accepted by said switching unit.

12. The circuit as claimed in claim 11, wherein said amplifying unit comprises an amplifier, a first resistor, and a second resistor, said amplifier comprises an inverting input, a non-inverting input, and an output, said first resistor is connected between said transforming unit and said inverting input of said amplifier, said second resistor is connected between said inverting input and said output of said amplifier, and said non-inverting input of said amplifier is grounded.

13. The circuit as claimed in claim 12, wherein said switching unit comprises a metal-oxide semiconductor field-effect transistor (MOSFET), said MOSFET comprises a gate, a source, and a drain, said gate of said MOSFET is connected to said output of said amplifier, said drain of said MOSFET is connected to said adjusting unit, and said source of said MOSFET is grounded.

\* \* \* \* \*